United States Patent
Hobby et al.

(10) Patent No.: US 6,816,920 B2
(45) Date of Patent: Nov. 9, 2004

(54) METHOD AND SYSTEM FOR MANAGING INFORMATION FOR A COMPUTER SYSTEM

(75) Inventors: John W. Hobby, Morgan Hill, CA (US); Farid Afshar, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 10/100,908

(22) Filed: Mar. 20, 2002

(65) Prior Publication Data

US 2003/0182473 A1 Sep. 25, 2003

(51) Int. Cl.⁷ ................................................. G06F 3/00

(52) U.S. Cl. ............................ 710/15; 710/17; 710/18; 710/19

(58) Field of Search ...................... 710/8–10, 15–19, 710/1

(56) References Cited

U.S. PATENT DOCUMENTS

| | | | | |
|---|---|---|---|---|
| 5,432,715 A | * | 7/1995 | Shigematsu et al. | 702/188 |
| 5,628,027 A | * | 5/1997 | Belmont | 710/1 |
| 5,809,329 A | * | 9/1998 | Lichtman et al. | 710/8 |
| 6,009,466 A | * | 12/1999 | Axberg et al. | 709/220 |
| 6,076,106 A | | 6/2000 | Hammer et al. | 709/223 |
| 6,253,240 B1 | * | 6/2001 | Axberg et al. | 709/223 |
| 6,269,417 B1 | * | 7/2001 | Mahalingam | 710/104 |
| 6,480,901 B1 | * | 11/2002 | Weber et al. | 709/246 |
| 2002/0065840 A1 | * | 5/2002 | McBrearty et al. | 707/202 |
| 2002/0133695 A1 | * | 9/2002 | Khatri et al. | 713/1 |
| 2003/0163768 A1 | * | 8/2003 | Dawkins et al. | 714/43 |

* cited by examiner

Primary Examiner—Jeffrey Gaffin
Assistant Examiner—David Martinez

(57) ABSTRACT

A method and system for managing I/O information for a computer system is disclosed. The method comprises gathering I/O information for a plurality of devices in the computer system when the computer system is booted, formatting the I/O information, storing the formatted I/O information and displaying the formatted I/O information on a display means to be viewed by an operator for monitoring and managing the I/O information for the computer system.

18 Claims, 3 Drawing Sheets

| INSTANCE | HW PATH | COUNT | SLOT | TYPE | FILE |
|---|---|---|---|---|---|
| c3 | 0/0/10/0/0 | 447 | 9 | fc | count.0.0.10.0.0 |
| c9 | 0/0/10/0/0 | | 9 | | |
| c13 | 0/0/10/0/0 | | 9 | | |
| c16 | 0/0/10/0/0 | | 9 | | |
| c20 | 0/0/10/0/0 | | 9 | | |
| c24 | 0/0/10/0/0 | | 9 | | |
| c4 | 0/0/11/0/0 | 447 | 8 | fc | count.0.0.11.0.0 |
| c8 | 0/0/11/0/0 | | 8 | | |
| c12 | 0/0/11/0/0 | | 8 | | |
| c17 | 0/0/11/0/0 | | 8 | | |
| c21 | 0/0/11/0/0 | | 8 | | |
| c25 | 0/0/11/0/0 | | 8 | | |
| c5 | 0/0/12/0/0 | 447 | 7 | fc | count.0.0.12.0.0 |
| c10 | 0/0/12/0/0 | | 7 | | |
| c14 | 0/0/12/0/0 | | 7 | | |
| c18 | 0/0/12/0/0 | | 7 | | |
| c22 | 0/0/12/0/0 | | 7 | | |
| c26 | 0/0/12/0/0 | | 7 | | |
| c2 | 0/0/8/0/0 | 5 | 11 | LVD | count.0.0.8.0.0 |
| c6 | 0/0/9/0/0 | 447 | 10 | fc | count.0.0.9.0.0 |
| c7 | 0/0/9/0/0 | | 10 | | |
| c11 | 0/0/9/0/0 | | 10 | | |
| c15 | 0/0/9/0/0 | | 10 | | |
| c19 | 0/0/9/0/0 | | 10 | | |
| c23 | 0/0/9/0/0 | | 10 | | |
| TOTAL | | 1793 | | | |

THE LISTS HAVE BEEN SAVED AS /tmp/multi/count.HWPATH (i.e. count.10.8).
THE COMPLETE LIST HAS BEEN SAVED AS /tmp/multi/count

SYSTEM MODEL: 9000/800/SD32000

PHYSICAL VOLUMES BELONGING IN ROOT VOLUME GROUP:
    /dev/dsk/c2t0d0 (0/0/8/0/0.0.0) – BOOT DISK

SWAPINFO:

| TYPE | Kb AVAIL | Kb USED | Kb FREE | PCT USED | START/ LIMIT | Kb RESERVE | PRI | NAME |
|---|---|---|---|---|---|---|---|---|
| DEV | 9027584 | 0 | 9025536 | 0% | 0 | - | 1 | /dev/vg00/1vol3 |
| DEV | 17783240 | 62072 | 17718664 | 0% | 0 | - | 0 | /dev/dsk/c2t1d0 |
| RESERVE | - | 225676 | -225676 | | | | | |
| MEMORY | 6443704 | 4818536 | 1625168 | 75% | | | | |

*FIG. 3*

METHOD AND SYSTEM FOR MANAGING INFORMATION FOR A COMPUTER SYSTEM

TECHNICAL FIELD

The technical field is computer systems, particularly to a method for managing information for a computer system.

BACKGROUND

Various tools exist for managing information for input/output (I/O) devices in a computer system. The tools comprise a set of instructions, or a script, programmed in code understood by the computer system. The tools gather and display different kinds of I/O information related to the configuration of the I/O devices in the computer system, such as, for example, the hardware paths of the I/O devices and the slot information for each hardware path.

An operator executes one or more tools during operation of the computer system in order to monitor and manage the condition of an I/O subsystem comprising a plurality of I/O devices. Execution of the tools may be extremely time consuming and cumbersome for computer systems with large I/O subsystems comprising thousands of I/O devices. Gathering information from a large I/O subsystem during operation of the computer system may require hours or days. Processing capacity may be significantly burdened and the computer system may be rendered unavailable to perform other tasks.

SUMMARY

A method for managing I/O information for a computer system is disclosed. The method comprises gathering I/O information for a plurality of devices in the computer system when the computer system is booted, formatting the I/O information, storing the formatted I/O information and displaying the formatted I/O information on a display means to be viewed by an operator for monitoring and managing the I/O information for the computer system.

A system for managing I/O information for a computer system is disclosed. The system comprises means for gathering I/O information for a plurality of devices in the computer system when the computer system is booted, means for formatting the I/O information, means for storing the formatted I/O information and means for displaying the formatted I/O information to be viewed by an operator for monitoring and managing the I/O information for the computer system.

A computer-readable medium containing instructions for configuring a computer system to manage I/O information is disclosed. The instructions comprise the steps of gathering I/O information for a plurality of devices in the computer system when the computer system is booted, formatting the I/O information, storing the formatted I/O information and displaying the formatted I/O information on a display means to be viewed by an operator for monitoring and managing the I/O information for the computer system.

A computer-readable medium that stores a program is disclosed. The program comprises means for gathering I/O information for a plurality of devices in the computer system when the computer system is booted, means for formatting the I/O information, means for storing the formatted I/O information and means for displaying the formatted I/O information to be viewed by an operator for monitoring and managing the I/O information for the computer system.

A computer-readable medium embodying a program of instructions is disclosed. The program of instructions comprises gathering I/O information for a plurality of devices in the computer system when the computer system is booted, formatting the I/O information, storing the formatted I/O information and displaying the formatted I/O information on a display means to be viewed by an operator for monitoring and managing the I/O information for the computer system.

DESCRIPTION OF THE DRAWINGS

The detailed description will refer to the following drawings, wherein like numerals refer to like elements, and wherein:

FIG. 3 is an output sample of formatted I/O information for the computer system of FIG. 1.

DETAILED DESCRIPTION

Figure 1:
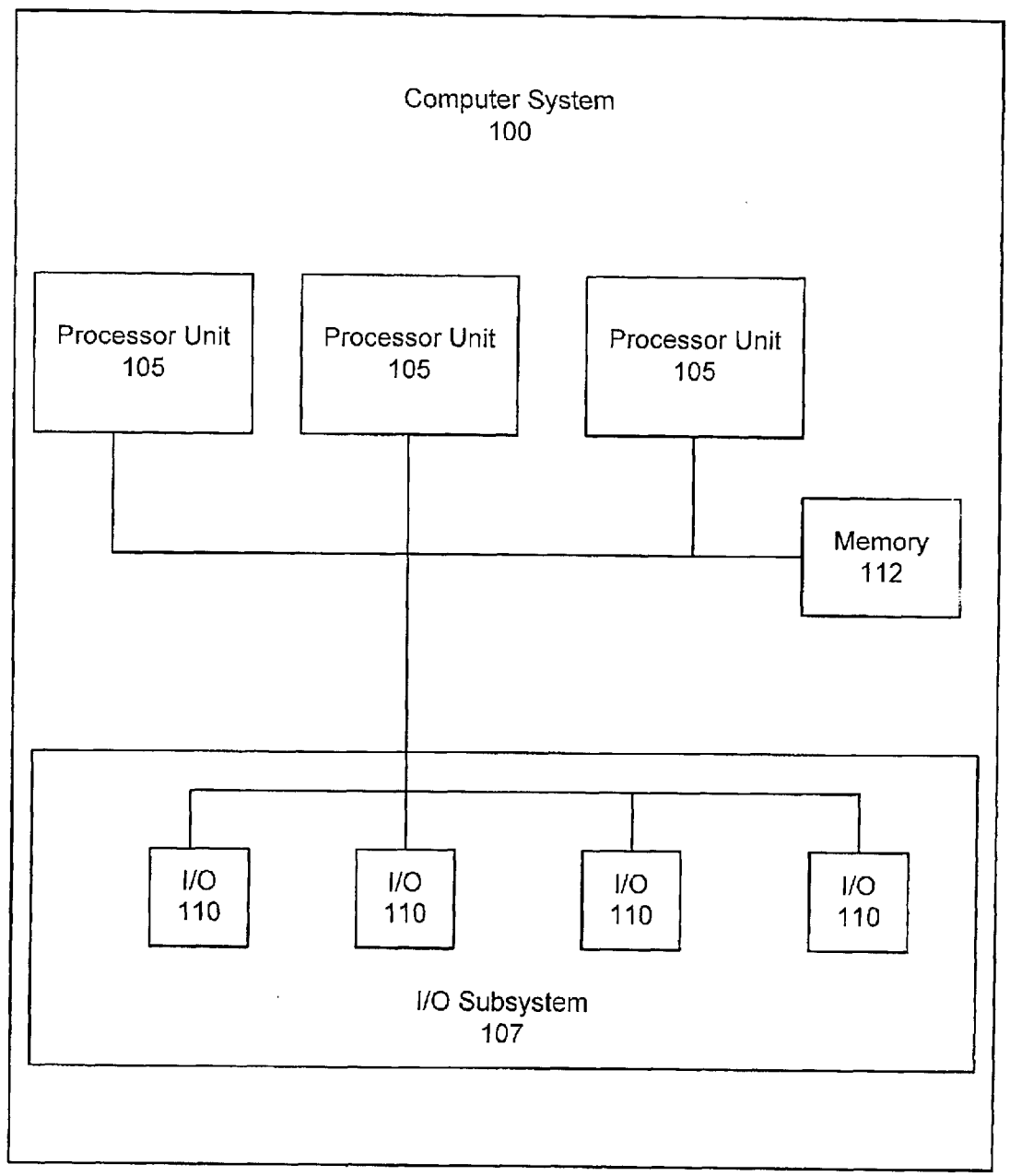
FIG. 1 is a block diagram of a computer system according to one embodiment.

FIG. 1 is a block diagram of a computer system 100 according to one embodiment. The computer system 100 may be, for example, a mini-computer, including one or more processor units 105 connected to an input/output (I/O) subsystem 107 and a memory unit 112. The I/O subsystem 107 comprises a plurality of I/O devices 110. The memory unit 112 may comprise, for example, one or more random access memory (RAM) devices or hard disk drive devices (not shown). The computer system 100 may operate, for example, on a UNIX based operating system (e.g., HP-UX, SunOS, Solaris and IRIX) or a Linux or NT system. The I/O devices 110 may be, for example, hard disk drives, floppy disk drives, CD-ROM drives, keyboards, printers, scanners, modems and other similar types of devices used to input, save or output data from the computer system 100. The processor units 105 and the memory unit 112 may be, for example, conventional devices used in computer systems known in the art.

The I/O devices 110 have various configuration properties that may be stored as data in the memory unit 112 at the time that each I/O device 110 is incorporated into the computer system 100. The data may include, for example, hardware paths, instance numbers associated with the hardware paths, slot numbers for the hardware paths, total count of I/O devices on each hardware path, total count of I/O devices in the computer system 100, root disk information, system model information and swap disk information of the computer system 100.

Hardware path refers to a path through various subsystems to a particular I/O device 110. Instance number refers to a unique number assigned by the operating system to the I/O device 110 that is used to address the I/O device 110. The instance number may also refer to a unique number assigned to a group of I/O devices 110 on a same bus. Slot number refers to a physical location of a host bus adapter used to interface with the I/O device 110. The class of the I/O device 110 refers to the generic category that characterizes the I/O device 110. Examples of classes may include disk devices or tape devices. System model information refers to the specific model number of the computer system 100. Root disk information refers to the address of a disk that is used by the computer system 100 in the booting process, including any and all hardware paths to the disk and any associated mirror disks. Swap disk information refers to information concerning one or more disks used for virtual memory in the computer system 100. Virtual memory has the effect of virtually increasing the size of physical memory. The swap disk information may include, for example, the size of the memory space allocated to virtual memory and the location and usage of the disk or disks.

Figure 2:
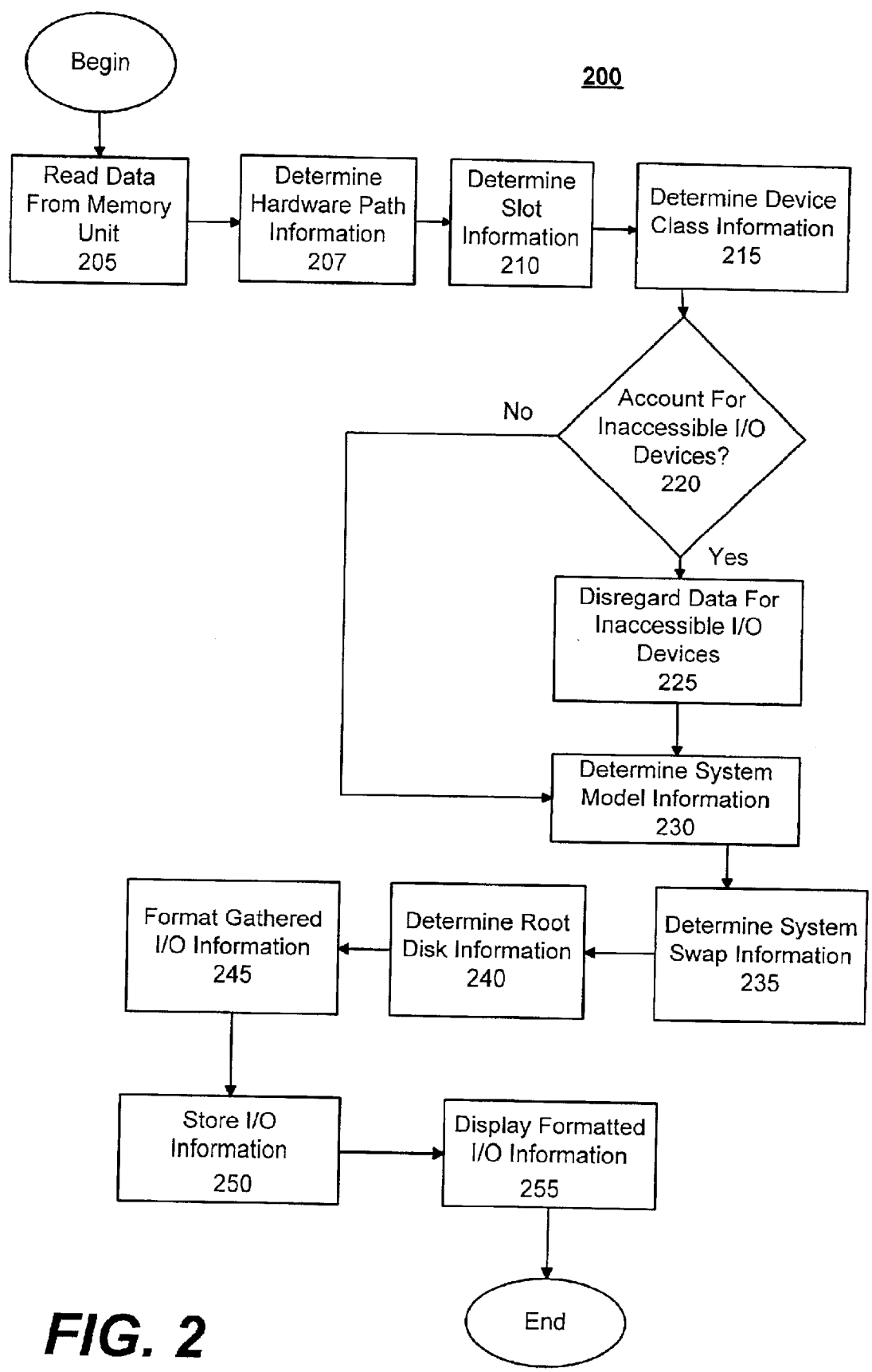
FIG. 2 is a flow chart illustrating a method for managing I/O information for the computer system of FIG. 1.

FIG. 2 is a flow chart 200 illustrating a method for managing I/O information for the computer system 100. In step 205, as the computer system 100 is booted, a script reads the data representing the configuration properties of the I/O devices 110 that have been previously stored in the memory unit 112. In step 207, the script determines the hardware paths of the I/O devices 110, determines the number of I/O devices 110 on each hardware path and determines the instance numbers assigned to the hardware paths. In step 210, the script determines the slot information for each hardware path. The class of each I/O device 110 for each hardware path is determined in step 215.

It is possible for one or more I/O devices 110 to be rendered inaccessible to the computer system 100 while remaining logically intact with respect to the operating system of the computer system 100. I/O devices 110 may be rendered inaccessible by, for example, powering off or physically removing the I/O devices 110 from the computer system 100. In a UNIX based operating system, for example, all I/O devices 110 are accessed using special files known as device files. Device files may be created automatically by the operating system during boot up of the computer system 100 or manually by an operator while the computer system 100 is in operation. When reporting configured I/O devices 110, the operating system may list all accessible I/O devices 110 with a "CLAIMED" status. However, if a CLAIMED I/O device 110 is rendered inaccessible without removing the corresponding device file with respect to the operating system, the operating system will replace the CLAIMED state of the I/O device 110 with a "NO_HW" status, indicating that the I/O device 110 is no longer accessible to the computer system 100. The NO_HW device files will remain in their original directory until the device files are logically removed with respect to the operating system by the operator.

In order to obtain an accurate count of the number of I/O devices 110 present in the computer system 100, NO_HW device files corresponding to inaccessible I/O devices 110 may be accounted for in step 220 and the data corresponding to the inaccessible I/O devices 110 may be disregarded in step 225. For example, in the UNIX based operating system described above, the script searches all of the devices files for the I/O devices 110 in the computer system 100 for the keyword NO_HW. Any NO_HW device files that are found are removed by the operating system (e.g., by using the rmsf command).

The script determines system model information in step 230, determines system swap information in step 235 and determines root disk information in step 240. All of the information determined in steps 210-240 is gathered and formatted in step 245 in a manner that facilitates viewing by the operator. An electronic file is created for the I/O information for each hardware path. The I/O information for each hardware path is stored in a corresponding electronic file in the memory unit 112 in step 250. The stored I/O information may be used by the operator with other scripts to set up volume groups or to more closely examine a list of devices present on a bus. In step 255, the formatted I/O information may be displayed on a display means to be viewed by the operator for monitoring and managing the I/O information for the computer system 100. The display means may be, for example, a monitor or print media.

The script also may include an option to update previously gathered information with any new I/O information each time the computer system 100 is booted. When the computer system 100 is booted, the script is executed and any old information, if present, is stored in the memory unit 112 and new information is generated according to the script. Each of the steps of the script may be performed, for example, by UNIX commands and K shell programming that are known in the art. It is understood by those of ordinary skill in the art that the steps of the flowchart 200 may be executed in various alternative sequences.

FIG. 3 is an output sample of formatted I/O information for the computer system 100. The output sample may include a chart displaying, for example, hardware path, instance number, slot information, system model and swap information and root disk information.

Since the I/O information for the computer system 100 is gathered at boot up of the computer system 100, not during operation, the operator may recall and display the formatted I/O information stored in the memory unit 112 at any time without burdening the processing capacity of the computer system 100. This allows the operator to effectively and conveniently manage information for the I/O devices 110 in the computer system 100.

While the present invention has been described in connection with an exemplary embodiment, it will be understood that many modifications will be readily apparent to those skilled in the art, and this application is intended to cover any variations thereof.

What is claimed is:

1. A method for managing input/output (I/O) information for a computer system, comprising:

gathering I/O information for a plurality of devices in the computer system when the computer system is booted, wherein the gathering includes:
- reading data for one or more of the devices from a memory unit, wherein the data represents properties of the devices,
- determining hardware path information for one or more of the devices,
- determining slot information for one or more hardware paths,
- determining device class information for each hardware path,
- determining system model information for the computer system,
- determining system swap information for the computer system, and
- determining root disk information;

formatting the I/O information;

storing the formatted I/O information; and displaying the formatted I/O information on a display means to be viewed by an operator for monitoring and managing the I/O information for the computer system.

2. The method of claim 1, wherein the display means comprises a monitor.

3. The method of claim 1, wherein the display means comprises print media.

4. The method of claim 1, wherein the determining hardware path information comprises:
- determining the hardware paths of the devices;
- determining a number of devices on each hardware path; and
- determining instance numbers assigned to the hardware paths.

5. The method of claim 1, wherein the reading comprises:
   accounting for any devices that have been rendered inaccessible to the computer system; and
   disregarding the data for any devices that have been rendered inaccessible to the computer system.

6. The method of claim 1, wherein the storing the formatted I/O information comprises:
   creating an electronic file for individual hardware paths; and
   storing the formatted I/O information for the individual hardware paths in corresponding electronic files.

7. A system for managing I/O information for a computer system, comprising:
   means for gathering I/O information for a plurality of devices in the computer system when the computer system is booted, the means for gathering includes:
      means for reading data for one or more of the devices from a memory unit, wherein the data represents properties of the devices,
      means for determining hardware path information for one or more of the devices,
      means for determining slot information for one or more hardware paths,
      means for determining device class information for each hardware path,
      means for determining system model information for the computer system
      means for determining system swap information for the computer system, and
      means for determining root disk information;
   means for formatting the I/O information;
   means for storing the formatted I/O information; and
   means for displaying the formatted I/O information to be viewed by an operator for monitoring and managing the I/O information for the computer system.

8. The system of claim 7, wherein the means for displaying comprises a monitor.

9. The system of claim 7, wherein the means for displaying comprises print media.

10. The system of claim 7, wherein the means for reading data comprises:
    means for accounting for any devices that have been rendered inaccessible to the computer system; and
    means for disregarding the data for any devices that have been rendered inaccessible to the computer system.

11. The system of claim 7, wherein the means for storing the formatted I/O information comprises:
    means for creating an electronic file for individual hardware paths; and
    means for storing the formatted I/O information for individual hardware paths in corresponding electronic files.

12. A computer-readable medium containing instructions for configuring a computer system to manage I/O information, the instructions comprising:
    gathering I/O information for a plurality of devices in the computer system when the computer system is booted, wherein the gathering includes:
       reading data for one or more of the devices from a memory unit, wherein the data represents properties of the devices,
       determining hardware path information for one or more of the devices,
       determining slot information for one or more hardware paths,
       determining device class information for each hardware path,
       determining system model information for the computer system,
       determining system swap information for the computer system, and
       determining root disk information;
    formatting the I/O information;
    storing the formatted I/O information; and
    displaying the formatted I/O information on a display means to be viewed by an operator for monitoring and managing the I/O information for the computer system.

13. The computer-readable medium of claim 12 containing instructions for configuring a computer system to manage I/O information, wherein the storing comprises:
    creating an electronic file for individual hardware paths; and
    storing the formatted I/O information for the individual hardware paths in corresponding electronic files.

14. A computer-readable medium embodying a program of instructions, said program of instructions comprising:
    gathering I/O information for a plurality of devices in the computer system when the computer system is booted, wherein the gathering includes:
       reading data for one or more of the devices from a memory unit, wherein the data represents properties of the devices,
       determining hardware path information for one, or more of the devices,
       determining slot information for one or more hardware paths,
       determining device class information for each hardware path,
       determining system model information for the computer system,
       determining system swan information for the computer system, and
       determining root disk information;
    formatting the I/O information;
    storing the formatted I/O information; and
    displaying the formatted I/O information on a display means to be viewed by an operator for monitoring and managing the I/O information for the computer system.

15. The computer-readable medium of claim 14 embodying a program of instructions, wherein the instruction of storing comprises:
    creating an electronic file for individual hardware paths; and
    storing the formatted I/O information for the individual hardware paths in corresponding electronic files.

16. A method for managing I/O information for a computer system, comprising:
    gathering I/O information for a plurality of devices in the computer system if the computer system is booted, wherein the gathering includes:
       determining hardware path information for one or more of the devices,
       determining system swap information for one or more disks related to virtual memory in the computer system, and
       determining root disk information;
    formatting the I/O information;
    storing the formatted I/O information; and
    displaying the formatted I/O information on a display means to be viewed by an operator for monitoring and managing the I/O information for the computer system.

17. The method of claim 16, wherein the gathering comprises:
   reading data for one or more of the devices from a memory unit, wherein the data represents properties of the devices and wherein reading further including:
      accounting for any devices that have been rendered inaccessible to the computer system; and
      disregarding the data for any devices that have been rendered inaccessible to the computer system.

18. The method of claim 17, wherein storing the formatted I/O information comprises:
   creating an electronic file for individual hardware paths; and
   storing the formatted I/O information for the individual hardware paths in corresponding electronic files.

* * * * *